United States Patent
Luerkens et al.

(10) Patent No.: US 7,539,029 B2
(45) Date of Patent: May 26, 2009

(54) 3-PHASE SOLAR CONVERTER CIRCUIT AND METHOD

(75) Inventors: Peter Luerkens, Aachen (DE); Matthias Wendt, Wuerselen (DE); Thomas Duerbaum, Baiersdorf (DE); Heinz Van Der Broeck, Zuelpich (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 190 days.

(21) Appl. No.: 11/572,215

(22) PCT Filed: Jul. 7, 2005

(86) PCT No.: PCT/IB2005/052265

§ 371 (c)(1),
(2), (4) Date: Jan. 17, 2007

(87) PCT Pub. No.: WO2006/011071

PCT Pub. Date: Feb. 2, 2006

(65) Prior Publication Data

US 2008/0094017 A1   Apr. 24, 2008

(30) Foreign Application Priority Data

Jul. 20, 2004   (EP)   ............................ 04103446

(51) Int. Cl.
*H02M 5/45*   (2006.01)
(52) U.S. Cl. ........................................ 363/37
(58) Field of Classification Search ............... 363/34, 363/36, 37, 97, 98, 131, 132
See application file for complete search history.

(56) References Cited

U.S. PATENT DOCUMENTS

| | | | |
|---|---|---|---|
| 6,151,234 A | 11/2000 | Oldenkamp | |
| 6,433,522 B1 | 8/2002 | Siri | |
| 6,678,174 B2* | 1/2004 | Suzui et al. | 363/55 |
| 6,690,593 B2* | 2/2004 | Kimura et al. | 363/98 |
| 6,940,735 B2* | 9/2005 | Deng et al. | 363/37 |
| 7,414,870 B2* | 8/2008 | Rottger et al. | 363/98 |
| 2003/0053323 A1 | 3/2003 | Kimura et al. | |
| 2004/0245968 A1 | 12/2004 | Burger et al. | |

FOREIGN PATENT DOCUMENTS

DE   19519369 A1   11/1996
JP   2001178145 A   6/2001

OTHER PUBLICATIONS

F. Antunes, et al: A Three-Phase Grid-Connected PV Systems, IEEE IECON, Oct. 2000, vol. 1, pp. 723-728, XP010569706.

* cited by examiner

*Primary Examiner*—Matthew V Nguyen

(57) ABSTRACT

A conversion circuit for converting solar power into an alternating 3-phase mains comprises a converter for converting the power from a solar cell into an unipolar converter output voltage provided between a first and a second converter output terminal of the converter, the converter having a constant power output regulation. The conversion circuit further comprises an inverter for cyclically switching one of three 3-phase output terminals to the first converter output terminal, one to the second converter output terminal and one intermittently to the first and second converter output terminal. With this conversion circuit and method, high capacity energy storage components (such as a capacitor having a large capacitance) can be avoided in the conversion circuit.

20 Claims, 2 Drawing Sheets

3-PHASE SOLAR CONVERTER CIRCUIT AND METHOD

The invention relates to a conversion circuit for converting electrical power provided by a solar cell into an alternating 3-phase mains electrical power, comprising:
- a converter for converting the electrical power provided by the solar cell into an unipolar converter output voltage provided over a first and a second converter output terminal of the converter, and
- an inverter for converting the converter output voltage into the 3-phase mains electrical power, the inverter comprising 3 switch assemblies, each for switching one of 3 3-phase output terminals to the first or second converter output terminals, the switch assemblies being controlled by a switching control unit. Further, the invention relates to a solar power generator comprising a solar cell for converting solar radiated power into an electrical power, and such a conversion circuit. Furthermore, the invention related to an energy supply system for supplying energy to a symmetrical 3-phase utility network (such as a 3-phase mains network), comprising a direct current energy source and such a conversion circuit. Still further, the invention relates to a method for converting electrical power provided by a solar cell into an alternating 3-phase mains power, comprising:
converting the electrical power provided by the solar cell into an unipolar converter output voltage provided over a first and a second converter output terminal of the converter, and
converting the converter output voltage into the 3-phase mains electrical power provided at 3 3-phase output terminals, by switching each of the 3 3-phase output terminals to the first or second converter output terminals, the switch assemblies being controlled by a switching control unit.

DE 195-19-369 describes an electrical circuit for providing power to a load. A 3-phase load (a 3-phase induction motor) is powered by an inverter in which two outputs are connected either to an intermediate voltage or to ground. The remaining output is set at an intermediate voltage making use of a pulse width modulation by switching at a high frequency. The outputs are switched in a cyclic manner. Since at each moment in time only one of the 3 outputs is switched at the high frequency, switching losses associated therewith are comparatively low.

A problem associated with the circuit according to the state of the art is that the inverter generates harmonics of the fundamental frequency of the 3-phase output signal. Suppressing these harmonics would require large filter coils which would increase cost price and dimensions of the inverter.

A goal of the invention is to provide an improved conversion circuit.

To achieve this goal and other goals, the conversion circuit according to the invention is characterized in that:
the converter comprises a constant power output regulation for providing a constant converter output power over a converter output voltage range, and in that
the switching control unit is arranged for switching one of the 3-phase output terminals to the first converter output terminal, one to the second converter output terminal and one intermittently to the first and second converter output terminal, and the cyclically switching of the 3-phase output terminals to accomplish that each of the 3-phase output terminals is in a cycle time of the mains in succession switched to the first converter output terminal, intermittently to the first and second converter output terminal, to the second converter output terminal, and again intermittently to the first and second converter output terminal. The conversion circuit comprises a converter and an inverter. As a deviation from the state of the art, in which the converter generates a constant direct current electrical output voltage, according to the invention the converter generates a constant power output. Thus, when a load current on the converter increases, the converter output voltage decreases. On the contrary, when the load current of the converter decreases, the converter output voltage increases. Hence, the product of the converter output voltage and the converter load current drawn from the converter is made constant over a converter output voltage range preferably corresponding to an operational voltage range between a minimum and a maximum converter output power. Such a converter, when combined with the inverter according to the invention, produces an unipolar output voltage showing a ripple, the ripple being reciprocally proportional to a ripple in the load current, hence to the current drawn from the converter by the inverter, an increase in load current drawn from the converter by the inverter causing a decrease in the converter output voltage due to the constant power output regulation. The inventor has had the insight that if such a converter is combined with the inverter according to the invention, a highly advantageous conversion circuit is created. At first, substantially no higher harmonics are generated with the conversion circuit according to the invention. Due to the constant power output regulation, a ripple on the converter output voltage is created which correspond to a waveform of peaks of the 3-phase sine signals to be generated. With the inverter according to the invention, advantageous use is made of these waveforms by an appropriate cyclical switching of each of the output terminals to the first converter output terminal (in a region of the sine signal around a peak value thereof), the second converter output terminal (in a region of the sine signal around the negative peak), and the intermittent switching of the terminal between the first converter output terminal and the second converter output terminal (to effectively create a voltage varying over time such that the sine signal in the time period between the positive and negative peaks is generated.

A further advantage of the conversion circuit according to the invention is that no large energy storage components (such as a capacitor or an inductor) are required in the conversion circuit according to the invention. Thus, the fact that the converter as applied in the conversion circuit according to the invention provides a constant power output not only provides an advantageous wave form which is used in combination with the inverter according to the invention to generate a wave form substantially free of undesired, higher harmonics, but also provides the advantage that it obviates the need to include one or more large capacitors in the converter. Also, the inverter as comprised in the conversion circuit according to the invention does not require any substantial energy storage (be it either in the form of capacitors or in the form of inductors). As such large energy storing components are not required, reliability and lifetime of the conversion circuit will increase, as problems due to a limited lifetime of e.g. an electrolytic capacitor are obviated. Further, dimensions of the conversion circuit will decrease as such energy storing components having large dimensions are not required, and cost price will be decreased too. A further advantage is that the conversion circuit can now be produced in a highly automated manner, as the required electronic components for the conversion circuit can now for a more large part be selected in a "surface mount" form, or at least such that these components can be automatically mounted, thus simplifying production of the conversion circuit.

A still further advantage is that efficiency of the conversion circuit increases, as intermittent switching is performed at each moment in time for one of the terminals only, hence power losses associated with such switching are reduced as such losses do not occur in the switches associated with the other two of the terminals.

In an advantageous embodiment, the control unit is arranged for performing the intermittent switching substantially at zero current through the respective switch assembly. In this manner, power losses are reduced even further, as the intermittent switching is performed at substantially zero current through the respective switch assembly. This is supported by a sufficient voltage reserve over nearly a whole switching phase, as the switching is performed near a zerocrossing, being again a benefit of switching only near the zerocrossings.

Advantageously the converter comprises an input power measuring circuit for measuring a converter input power provided to the converter and a control circuit for adapting the converter output power to equal the converter input power. Thus, the conversion circuit is adapted to the amount of solar electrical power as provided by the solar cell as the circuit adapts the converter output power to equal the converter-input power as provided by the solar cell. Hence, no energy will be stored in the converter, thus obviating energy storing components having a high capacity (such as large capacitors) in the converter.

Advantageously, the input power measuring circuit is further adapted for maximum power tracking of the solar cell, for adjusting a converter input voltage and converter input current to a maximum power point of the solar cell. Current solar cells show a maximum power, point, i.e. value of solar cell voltage and current at which, at a given power, efficiency is maximized. As the input power measuring circuit is adapted to operate the solar cell at this point, efficiency is maximized.

Advantageously, the control unit is arranged for performing the intermittent switching at a frequency of at least ten times (more preferably at least 50 times) a cycle frequency of the 3 phase mains, thereby easing filtering to suppress switching frequency components in the 3-phase mains output.

In an advantageous embodiment, the conversion circuit comprises multiple converters, the output terminals of which being connected in parallel. Connecting the output terminals in parallel is eased due to an independent power control of each of the converters. Due to the preferred automatic adjustment of output power to solar radiation power input the multiple converters will automatically distribute input current between them reflecting solar power distribution. No additional communication between the converters is required, nor between inverter and converters. The solar power generator according to the invention comprises a solar cell for converting solar radiated power into an electrical power and a conversion circuit according to the invention for converting the electrical power into an alternating 3-phase mains power. The solar power generator is in an advantageous embodiment comprised of at least one outdoor unit and an indoor unit. The at least one outdoor unit comprises the solar cell and the converter while the indoor unit comprises the inverter. The outdoor unit will normally be placed outdoors, e.g. on a roof of a building. For optimum power efficiency, the converter is comprised in the outdoor unit to convert the electrical energy generated by the solar cell into the converter output voltage.

The converter output voltage is advantageously chosen such that it has a value which enables transportation of the electrical energy to the indoor unit without substantial losses. The indoor unit converts the converter output voltage into the 3-phase mains, and hence will normally (but not necessarily) be placed indoors, in proximity of a mains network connection. As described above, the converter as comprised in the conversion circuit according to the invention does not require large energy storage components, such as large capacitors. In practice, these components (e.g. a capacitor having a high capacitance) tend to be a significant limiting factor for limiting lifetime and reliability of the outdoor unit. Especially in case that a part of the conversion circuit is placed outdoors, e.g. on a roof of a building, reliability and lifetime are significantly improved as adverse effects on reliability and lifetime of the energy storing components, as occurring because of high temperatures (e.g. during high solar power situations) and large temperature fluctuations commonly found at such locations, are obviated. As such energy storing component can be avoided with the converter comprised in the conversion circuit according to the invention, these adverse effects on lifetime of the outdoor unit are eliminated, hence providing a significant increase in reliability and lifetime thereof. This is especially of advantage as the outdoor unit is commonly installed at a location that is difficult to reach such as on top of a roof of a building. The increased lifetime and reliability of the conversion circuit according to the invention make an integration of the solar cell having a long lifetime, with the conversion circuit according to the invention, or at least the converter thereof, possible without sacrificing module lifetime. In addition, installation costs will be reduced and enables to make full use of the scalability as discussed above.

The conversion circuit according to the invention can be provided with power from a solar cell or any other direct current power source, such as a battery, accumulator, fuel cell, etc.

The method according to the invention is characterized in that the step of converting the electrical power provided by the solar cell into the unipolar converter output voltage comprises:

providing a constant converter output power over a converter output voltage range, and in that the step of converting the converter output voltage into the 3-phase mains electrical power comprises:
  switching one of the 3-phase output terminals to the first converter output terminal, one to the second converter output terminal and one intermittently to the first and second converter output terminal,
  cyclically switching the 3-phase output terminals to accomplish that each of the 3-phase output terminals is in a cycle time of the mains in succession switched to the first converter output terminal, intermittently to the first and second converter output terminal, to the second converter output terminal and intermittently to the first and second converter output terminal. With the method according to the invention, similar or identical advantages are achieved as with the conversion circuit according to the invention. Also, similar or identical preferred embodiments as described with reference to the conversion circuit according to the invention are also applicable to the method according to the invention.

The invention will now be described based on a drawing, showing a non-limiting embodiment of the invention, in which.

Figure 1:
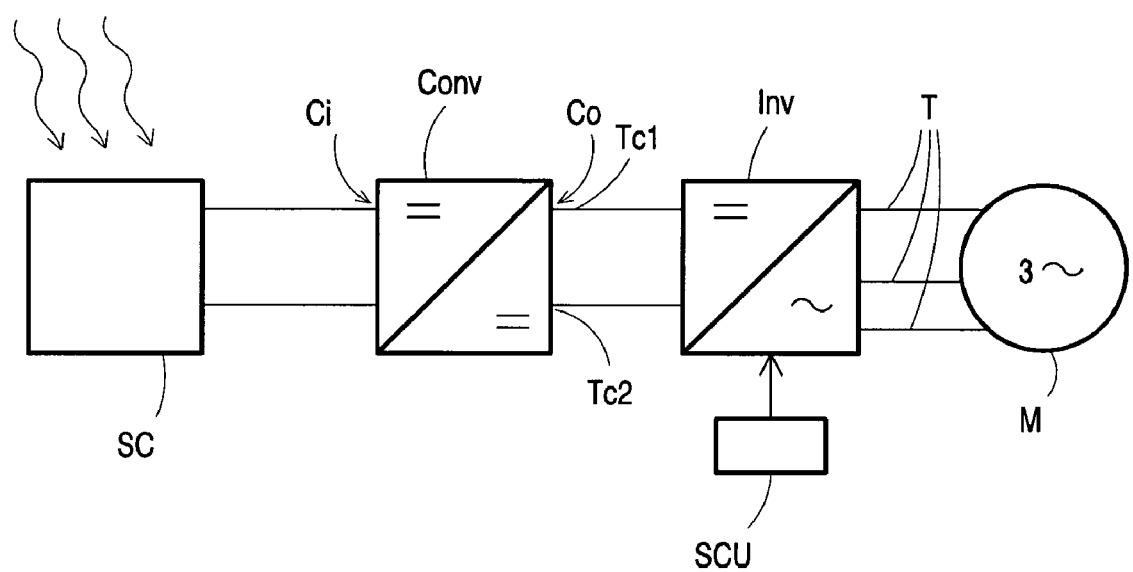
FIG. 1 shows a highly schematic circuit diagram of a conversion circuit according to the invention.

FIG. 1 shows a conversion circuit comprising a solar cell SC, a converter Conv, an inverter Inv, and a 3-phase mains, symbolically indicated by M. The solar cell CS can comprise a photoelectric cell, photovoltaic cell, or any other cell which converts optical energy into electrical energy. The solar cell SC can also comprise a plurality of such photoelectric, photovoltaic or other cells. The electrical energy as generated by the solar cell is provided to the converter Conv, in particular to a converter input Ci thereof. The converter input converts the solar generated electrical energy that normally comprises a relatively low voltage, or a fluctuating voltage depending on the amount of illumination on the solar cell SC, into a converter output voltage at a converter output Co having a first converter output terminal Tc1 and a second converter output terminal Tc2, the converter output voltage having a value suitable for inversion by the inverter Inv, by means of suitable switching operations, into to the 3-phase mains voltage of the 3-phase mains M. Typically, however not necessarily, the converter output voltage at the converter output Co will be substantially higher than the converter input voltage Ci, because the voltages provided by the solar cell SC are lower than the mains voltage of the 3-phase mains M. If however the solar cell comprises e.g. a large amount of series connected photocells, thus providing a high output voltage, the converter output voltage may not be substantially higher (e.g. in a same order of magnitude or even lower) than the converter input voltage. As solar illumination is relatively constant, at least does not comprise any substantial components on a mains frequency, the electrical energy provided at the converter input Ci will in general (however not necessarily) be relatively constant, i.e. does not comprise any component at a mains frequency, such as a 50 Hz of 60 Hz. Of course, the exact form of the electrical energy provided by the solar cell SC depends on the particular type of solar cell used, which can be a current source (photocurrent), a voltage source (photovoltaic), etc. In any case, the converter Conv converts the electrical energy provided to the converter input into a converter output voltage at the converter output Co, the converter output voltage being suitable for inversion by means of suitable switching operations by the inverter Inv into the 3-phase mains signal. The converter output voltage comprises an unipolar voltage, thus a voltage not showing changes in sign over time, the polarity of the converter output voltage remains the same. The inverter comprises a plurality of switch assemblies each comprising switches for switching the output terminals T of the inverter Inv to the converter output Co. The switching assemblies can, under control of a switching control unit SCU connect each of the terminals T to the first Tc1 or second Tc2 converter output terminal. The operation of the conversion circuit as depicted in FIG. 1 will now be described with reference to FIG. 2 and FIG. 3.

Figure 2:
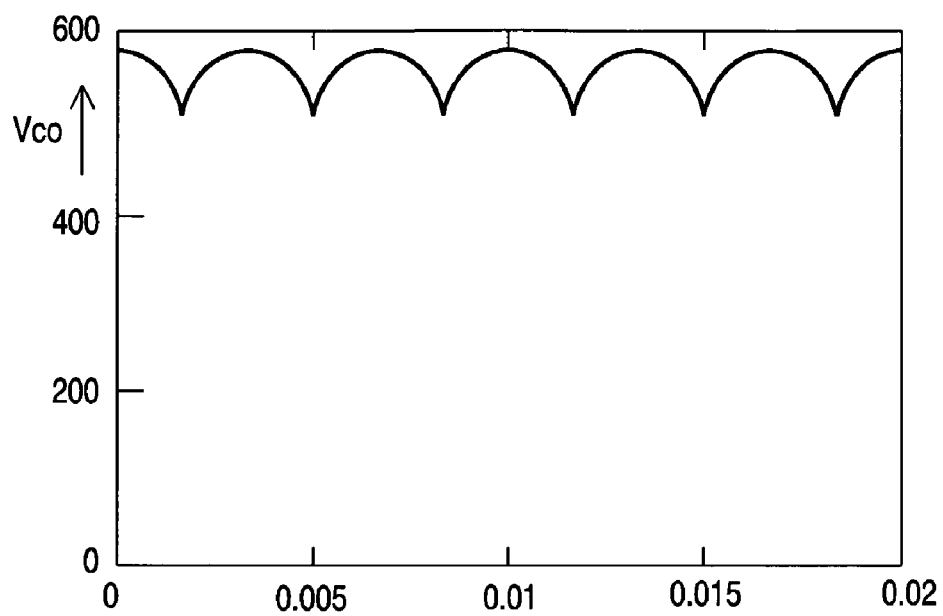
FIG. 2 shows a graph of a converter output voltage of the conversion circuit according to FIG. 1.

FIG. 2 depicts a graph with time along a horizontal axis and the converter output voltage $V_{Co}$ along the vertical axis. The converter comprises a constant power output regulation (not shown in detail in FIG. 1) for providing a constant converter output power over a converter output voltage range. Due to the switching of the inverter Inv, as controlled by the switching control unit SCU, an input current of the inverter Inv shows a periodic ripple, which results, due to the constant output power of the converter Conv, into a ripple of the converter output voltage $V_{Co}$. The inventors have devised that the waveform of this ripple corresponds to a peak region of sine waves of the 3-phase mains signal, more particular the wave form corresponds to an envelope of the 3 3-phase components of a 3-phase signal. Use is made of this waveform by the inverter Inv by switching the first Tc1 or second Tc2 converter output terminal to a respective terminals T when a mains signal at that particular terminal is around a (positive or negative) peak region. Between these regions of the wave form, the particular terminal is intermittently switched to the first Tc1 and second Tc2 converter output terminal resulting in a modulation of the output voltage and current at the terminal T, depending on a duty cycle of the switching. The intermittent switching is performed with a frequency that is advantageously substantially higher than a cycle frequency of the mains signal. Duty cycle of the switching is modulated such that the zero crossing curve of the sine wave between the peak regions is created. It is to be emphasized that the waveform as depicted in FIG. 2 at the converter output appears not only due to the fact that a constant output power regulation of the converter is comprised in the converter according to the invention, but also due to the particular switching according to the invention as applied in the inverter Inv according to the invention, in which the switching control unit is arranged for switching one of the output terminals to the first converter output terminal, one to the second converter output terminal and one intermittently to the first and second converter output terminal, and the cyclicly switching of the terminals such that each of the terminals is in a cycle time of the mains in succession switched to the first converter output terminal, intermittently to the first and second converter output terminal, to the second converter output terminal and again intermittently to the first and second converter output terminal. Maybe a simple way to understand the idea as applied by the inventors, is to phrase is as: By the switching, a change in input impedance of the inverter occurs which in combination with the constant output power regulation of the converter leads to the waveform as shown in FIG. 2.

Figure 3:
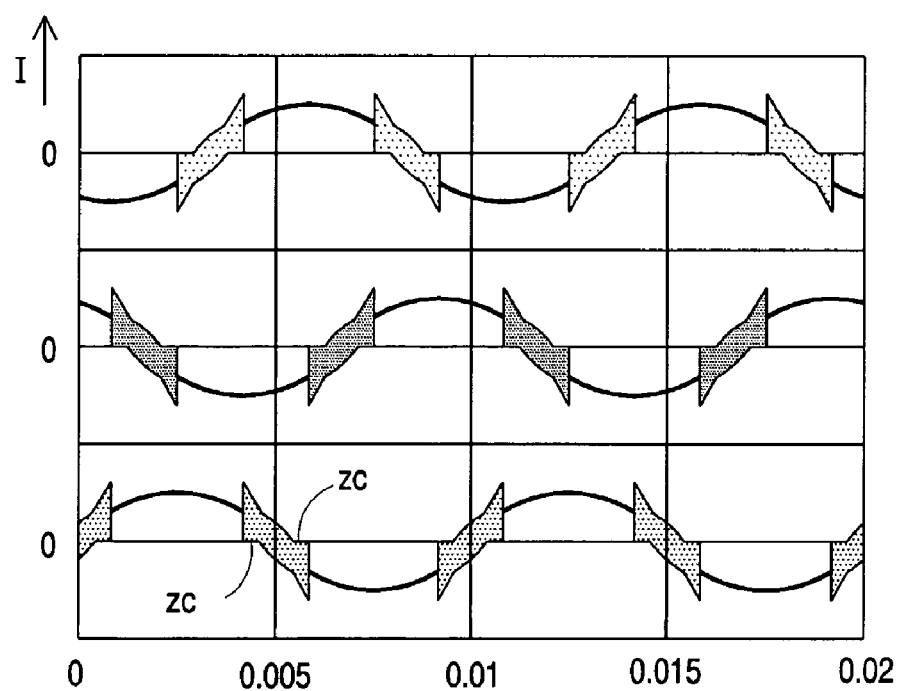
FIG. 3 shows a graph of the current in an inverter of the conversion circuit according to FIG. 1.

An example of the current obtained in the output terminals T is depicted in FIG. 3 showing a graph with time along the horizontal axis and currents in each of the 3 terminals along the vertical axis. As shown in FIG. 3 each of the 3 waveforms of the output currents shows positive peak regions and negative peak regions as well as regions in which the output currents have a low value and cross zero. In the regions in which the output current crosses zero, the respective terminal is intermittently switched to the first and second converter output terminal. A duty cycle of the switching determines the effective value of the output quantity. At a duty cycle of 50% (i.e. 50% the converter output voltage and 50% the reversed polarity converter output voltage) an effective output quantity of zero results. The frequency of the intermittent switching is advantageously substantially higher than a cycle frequency of the mains (in this example being 100 Hz). The intermittent switching at each moment in time takes place in each part of the cycle time of the mains, for one of the output terminals only, as can be derived from the waveforms of FIG. 3. The other terminals that are not intermittently switching at a particular moment in time are, at that particular moment in time connected either to the first converter output terminal or to the second converter output terminal. In most practical implementations, the output terminals T may not be connected directly to the 3 phase mains, as a low impedance of the mails would lead to large ripple currents. Therefore, the remaining ripple resulting from the intermittent switching can be filtered with small inductors connected in series with the output terminals T (the inductors not being shown in FIG. 1), resulting in a smoothing of the ripple in the mains signal as generated by the intermittent switching. Further smoothing may be realized with a further filter stage as known in the state of the art and comprising capacitors and inductors. As the intermittent switching is performed for one of the terminals only, switching related losses are low and can be further decreased by switching at zero current, as depicted in FIG. 3 by ZC.

An advantageous embodiment of the converter Conv comprises an input power measuring circuit for measuring a converter input power provided to it by the solar cell SC and a control circuit (not shown) for adapting the converter output power to equal the converter input power. As a result thereof, a more optimal regulation of the converter output power and thus of the waveform obtained at the converter output voltage is obtained, such that the waveform, and thus the ripple in the converter output voltage is adapted to provide a most optimum waveform for generating a 3-phase mains signal at the terminals T by the inverter Inv which has little or no higher harmonics. Thus, an optimal conversion by the conversion circuit can be achieved over a wide range of solar input power provided to the solar cell SC.

A solar power generator according to the invention comprises the solar cell SC and the conversion circuit according to the invention, the conversion circuit being comprised of the converter Conv and the inverter Inv. In a practical implementation it is advantageous that the converter Conv together with solar cell SC is comprised in an outdoor unit, e.g. for placement on a roof of a building while the inverter is placed indoors, i.e. in an indoor unit in proximity of a 3-phase electrical mains connection. As described above, due to the fact that the converter as well as the inverter of the conversion circuit according to the invention do not require any large capacity energy storage components (such as large capacitors), adverse effects thereof as occurring in the conversion circuit according to the state of the art, relating lifetime and reliability of the converter and the inverter are obviated. Further advantageous effects of the conversion circuit according to the invention have been described above.

It should be noted that the arrangement as described above works in a same advantageous way with any other direct current energy source, such as a fuels cell, accumulator or battery. The application of the inventions is thus not limited to a solar cell but can be applied to a variety of configurations (energy supply systems), where the energy of a direct current energy source has to be supplied to a (e.g. symmetrical) 3-phase mains voltage.

Thus, based on the insight that, as the solar energy has provided to the solar cell is substantially constant (i.e. is not periodic at a mains frequency) and as the sum of the output power on the three 3-phase output terminals of the inverter is substantially constant too (i.e. does not show a periodicity at a mains frequency of the mains) no large energy storing components (such as capacitors) would be required in the conversion circuit, the inventors have been able to devise the conversion circuit and method according to the invention having a converter with a constant power output and an inverter switching one of the output terminals to the first converter output terminal, one of the output terminals to the second converter output terminal, and a third one of the terminals intermittently to the first and second converter output terminal.

The invention claimed is:

1. A conversion circuit for converting electrical power provided by a solar cell into an alternating 3-phase mains electrical power, comprising:
a converter for converting the electrical power provided by the solar cell into an unipolar converter output voltage provided over a first and a second converter output terminal of the converter, and
an inverter for converting the converter output voltage into the 3-phase mains electrical power, the inverter including three switch assemblies, each for switching one of three 3-phase output terminals to the first or second converter output terminals, the switch assemblies being controlled by a switching control unit, characterized in that
the converter includes a constant power output regulation for providing a constant converter output power over a converter output voltage range, and in that
the switching control unit is arranged for switching one of the 3-phase output terminals to the first converter output terminal, one to the second converter output terminal and one intermittently to the first and second converter output terminal, and the cyclically switching of the 3-phase output terminals to accomplish that each of the 3-phase output terminals is in a cycle time of the mains in succession switched to the first converter output terminal, intermittently to the first and second converter output terminal, to the second converter output terminal, and again intermittently to the first and second converter output terminal.

2. The conversion circuit of claim 1, wherein the control unit is arranged for performing the intermittent switching substantially at zero current through the respective switch assembly.

3. The conversion circuit of claim 1, wherein the converter includes an input power measuring circuit for measuring a converter input power provided to the converter and a control circuit for adapting the converter output power to equal the converter input power.

4. The conversion circuit of claim 1, wherein the input power measuring circuit is further adapted for maximum power tracking of the solar cell, for adjusting a converter input voltage and converter input current to a maximum power point of the solar cell.

5. The conversion circuit of claim 1, wherein the control unit is arranged for performing the intermittent switching at a frequency of at least ten times a cycle frequency of the 3-phase mains.

6. The conversion circuit of claim 1, including multiple converters, the output terminals of which being connected in parallel.

7. A solar power generator including a solar cell for converting solar radiated power into an electrical power, and the conversion circuit of claim 1 for converting the electrical power into an alternating 3-phase mains power.

8. The solar power generator of claim 7, including an outdoor unit that includes the solar cell and the converter, and an indoor unit that includes the inverter.

9. An energy supply system for supplying energy to a symmetrical 3-phase utility network, including a direct current energy source and a conversion circuit of claim 1.

10. A method for converting electrical power provided by a solar cell into an alternating 3-phase mains power, comprising:
converting the electrical power provided by the solar cell into an unipolar converter output voltage provided over a first and a second converter output terminal of the converter, and
converting the converter output voltage into the 3-phase mains electrical power provided at three 3-phase output terminals, by switching each of the three 3-phase output terminals to the first or second converter output terminals, the switch assemblies being controlled by a switching control unit, wherein:

converting the electrical power provided by the solar cell into the unipolar converter output voltage includes providing a constant converter output power over a converter output voltage range, and converting the converter output voltage into the 3-phase mains electrical power includes:

switching one of the 3-phase output terminals to the first converter output terminal, one to the second converter output terminal and one intermittently to the first and second converter output terminal, cyclically switching the 3-phase output terminals to accomplish that each of the 3-phase output terminals is in a cycle time of the mains in succession switched to the first converter output terminal, intermittently to the first and second converter output terminal, to the second converter output terminal and intermittently to the first and second converter output terminal.

11. The conversion circuit of claim 2, wherein the converter includes an input power measuring circuit for measuring a converter input power provided to the converter and a control circuit for adapting the converter output power to equal the converter input power.

12. The conversion circuit of claim 11, wherein the control unit is arranged for performing the intermittent switching at a frequency of at least ten times a cycle frequency of the 3-phase mains.

13. The conversion circuit of claim 2, wherein the control unit is arranged for performing the intermittent switching at a frequency of at least ten times a cycle frequency of the 3-phase mains.

14. The conversion circuit of claim 3, wherein the control unit is arranged for performing the intermittent switching at a frequency of at least ten times a cycle frequency of the 3-phase mains.

15. The conversion circuit of claim 4, wherein the control unit is arranged for performing the intermittent switching at a frequency of at least ten times a cycle frequency of the 3-phase mains.

16. A solar power generator including a solar cell for converting solar radiated power into an electrical power, and the conversion circuit of claim 2 for converting the electrical power into an alternating 3-phase mains power.

17. A solar power generator including a solar cell for converting solar radiated power into an electrical power, and the conversion circuit of claim 3 for converting the electrical power into an alternating 3-phase mains power.

18. The method of claim 10, wherein providing the constant converter output power includes measuring a converter input power and adapting the converter output power to equal the converter input power.

19. The method of claim 16, wherein the intermittent switching is performed at a frequency of at least ten times a cycle frequency of the mains.

20. The method of claim 10, wherein the intermittent switching is performed at a frequency of at least ten times a cycle frequency of the mains.

* * * * *